(12) United States Patent
Vespasien et al.

(10) Patent No.: US 10,322,713 B2
(45) Date of Patent: Jun. 18, 2019

(54) METHOD FOR CONTROLLING A HYBRID TRANSMISSION FOR A MOTOR VEHICLE TAKING INTO ACCOUNT TRANSITION INTERRUPTIONS BETWEEN KINEMATIC MODES

(71) Applicant: RENAULT s.a.s., Boulogne-Billancourt (FR)

(72) Inventors: Jean-Marie Vespasien, Choisy-le-Roi (FR); Vivien Lalleron, Juvisy sur Orge (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 234 days.

(21) Appl. No.: 15/302,779

(22) PCT Filed: Mar. 10, 2015

(86) PCT No.: PCT/FR2015/050590
§ 371 (c)(1),
(2) Date: Dec. 21, 2016

(87) PCT Pub. No.: WO2015/155428
PCT Pub. Date: Oct. 15, 2015

(65) Prior Publication Data
US 2017/0120895 A1 May 4, 2017

(30) Foreign Application Priority Data
Apr. 11, 2014 (FR) .................................... 14 53265

(51) Int. Cl.
*B60W 20/30* (2016.01)
*B60K 6/54* (2007.10)
(Continued)

(52) U.S. Cl.
CPC ............... *B60W 20/30* (2013.01); *B60K 6/54* (2013.01); *B60K 6/547* (2013.01); *B60L 11/14* (2013.01);
(Continued)

(58) Field of Classification Search
CPC ...... B60W 20/00; B60W 20/20; B60W 20/30; B60W 2510/0225; B60W 2510/1005;
(Continued)

(56) References Cited

U.S. PATENT DOCUMENTS

| 10,046,753 B2 * | 8/2018 | Yukawa .................... B60K 6/48 |
| 2003/0045988 A1 * | 3/2003 | Suzuki .................... B60K 6/485 |
| | | 701/54 |

(Continued)

FOREIGN PATENT DOCUMENTS

| DE | 10 2009 045 507 A1 | 4/2011 |
| DE | 10 2013 202 552 A1 | 8/2013 |

(Continued)

OTHER PUBLICATIONS

International Search Report dated Jul. 1, 2015 in PCT/FR2015/050590 filed Mar. 10, 2015.
(Continued)

*Primary Examiner* — Thomas E Worden
(74) *Attorney, Agent, or Firm* — Oblon, McClelland, Maier & Neustadt, L.L.P.

(57) ABSTRACT

A method controls a hybrid transmission for a motor vehicle that can operate according to at least two kinematic modes involving various connections of at least one internal combustion engine, at least one electric motor, and at least two drive wheels. The method includes controlling the transition between kinematic modes in accordance with the current kinematic mode during the start of the transition and a kinematic mode setting, if it is determined that the current (Continued)

kinematic mode is not equal to the kinematic mode of the transition and that the kinematic mode setting is not equal to the final kinematic mode, making a decision regarding the suitability of a transition interruption, during a change of request of the driver during which it is determined whether an interruption of the action is underway, and then continuing the transition or undertaking a new transition according to the result.

5 Claims, 4 Drawing Sheets

(51) Int. Cl.
    *B60K 6/547*     (2007.10)
    *B60W 20/00*     (2016.01)
    *B60W 20/20*     (2016.01)
    *B60L 11/14*     (2006.01)

(52) U.S. Cl.
    CPC ............ *B60W 20/00* (2013.01); *B60W 20/20* (2013.01); *B60L 2240/486* (2013.01); *B60W 2510/0225* (2013.01); *B60W 2510/1005* (2013.01); *B60W 2540/00* (2013.01); *B60W 2710/1005* (2013.01); *B60Y 2300/70* (2013.01); *B60Y 2400/421* (2013.01); *B60Y 2400/70* (2013.01); *F16H 2306/24* (2013.01); *F16H 2306/30* (2013.01); *Y10S 903/917* (2013.01)

(58) Field of Classification Search
    CPC ...... B60W 2540/00; B60W 2710/1005; B60K 6/54; B60K 6/547; B60L 11/14; B60L 2240/486; B60Y 2300/70; B60Y 2400/421; B60Y 2400/70; F16H 2306/24; F16H 2306/30; Y10S 903/917
    See application file for complete search history.

(56) References Cited

U.S. PATENT DOCUMENTS

| | | | |
|---|---|---|---|
| 2003/0060329 A1* | 3/2003 | Sato | F16H 61/08 477/121 |
| 2004/0112158 A1* | 6/2004 | Norum | B60K 6/24 74/335 |
| 2013/0225361 A1* | 8/2013 | Gupta | B60W 10/105 477/3 |
| 2014/0038776 A1* | 2/2014 | Heap | B60K 6/445 477/180 |
| 2014/0142796 A1* | 5/2014 | Zollner | B60W 10/02 701/22 |
| 2014/0165780 A1* | 6/2014 | Fremau | B60K 6/48 74/665 A |
| 2014/0248993 A1* | 9/2014 | Dawidziak | B60K 6/105 477/5 |
| 2016/0272187 A1* | 9/2016 | Yukawa | B60K 6/48 |

FOREIGN PATENT DOCUMENTS

| | | |
|---|---|---|
| EP | 1 298 361 A2 | 4/2003 |
| WO | 2012/131259 A1 | 10/2012 |

OTHER PUBLICATIONS

French Search Report dated Nov. 27, 2014 in FR 1453265 filed Apr. 11, 2014.

* cited by examiner

METHOD FOR CONTROLLING A HYBRID TRANSMISSION FOR A MOTOR VEHICLE TAKING INTO ACCOUNT TRANSITION INTERRUPTIONS BETWEEN KINEMATIC MODES

BACKGROUND

The technical field of the invention relates to the control of a hybrid transmission with several modes for a motor vehicle, and more particularly, the control of such a transmission during mode change interruptions.

FIG. 1 shows a hybrid transmission for a motor vehicle comprising a primary shaft 1 connected to a flywheel 2, itself connected to an internal combustion engine 3.

A second primary shaft 6, concentric with the first primary shaft is connected to an electric machine 7.

The two primary shafts 1, 6 are provided with a set of gears 4, 8, 9 in order to transfer motive energy to a secondary shaft 10 that is also provided with a set of gears 11, 12, 14, connected to drive wheels via another intermediate drive 15 and a differential 16.

Two coupling means 5, 13 allow for different kinematic modes involving different connections of the internal combustion engine 3, the electric machine 7 and the drive wheels.

FIG. 2 illustrates the various kinematic modes available depending on the positions of the dog clutches of the coupling systems.

The first coupling means 5 between the two primary shafts 1, 6 can occupy three positions.

In a first position (position 0 of the primary dog clutch-neutral), the internal combustion engine 3 is uncoupled from the drive chain connecting the electric machine 7 to the drive wheels, In a second position (position 2 of the primary dog clutch-road), the internal combustion engine 3 drives the drive wheels independently of the electric machine 7, In a third position (position 1 of the primary dog clutch-coupling), the internal combustion engine 3 and the electric machine 7 are coupled so as to add their respective torques in the direction of the wheels.

The second coupling means 13 directly connecting the second primary shaft 6 connected to electric machine 7 and the secondary shaft 10 can also occupy three positions:

In a first position (position 0 of the secondary dog clutch-neutral), the electric machine 7 is not directly coupled to the secondary shaft 10.

In a second position (position 1 of the secondary dog clutch-city), the electric machine 7 is directly connected to the secondary shaft 10 with a first ratio.

In a third position (position 2 of the secondary dog clutch-highway), the electric machine 7 is directly connected to the secondary shaft 10 with a second ratio.

The three positions of each of the coupling means 5, 13 (which notably comprise dog clutches) allow new operating modes to be obtained, designated as (for example) Hyb21, ZEV1, Hyb11, Therm2, Neutral, Recharge, Hyb23, ZEV3 and Hvb33. It is possible to switch from one mode to the other by a set of transitions referenced a1 to a24 in FIGS. 2 and 3.

One of the competitive advantages of the type of transmission presented in FIG. 1 is that it does not include a mechanical synchronizer. Passing from one kinematic mode to another thus requires electronic control of the synchronization of the elements to be engaged.

This means that the passage from one kinematic mode to another must necessarily take place via a transition, during which it involves grasping the torque actuators (internal combustion engine 3 and electric machine 7) and controlling the displacement of the dog clutch(es) concerned by the transition.

Depending on the situation at hand, the mode change is more or less time-consuming. During the time it takes to make a kinematic mode change, the driver's intentions can change so as to call into question the transition in progress.

There is a need for a method for controlling a hybrid transmission capable of managing a transition interruption between kinematic modes.

BRIEF SUMMARY

The invention relates to a method for controlling a hybrid transmission for a motor vehicle operable in at least two kinematic modes involving different connections of at least one internal combustion engine, of at least one electric machine and at least two drive wheels. The method includes the following steps:

the transition between kinematic modes is controlled according to the current kinematic mode at the onset of the transition and a kinematic mode setpoint, if it is determined that the current kinetic mode is not equal to the kinetic mode of the transition step and that the kinetic mode setpoint is not equal to the final kinetic mode, a decision is made on whether a transition interruption is possible, during a change request of the driver during which it is determined if an interruption of the action is in progress, then the transition is continued or a new transition is carried out according to the result of the determination of an interruption of the action.

To control the transition between kinematic modes according to the current kinematic mode at the onset of the transition and a kinematic mode setpoint, the following steps can be performed:

it is determined if the kinematic mode setpoint corresponds to the current kinematic mode, if this is not the case, the current kinematic mode is stored in an initial kinematic mode value and the kinematic mode setpoint in a final kinematic mode value, then the trajectory to pass from the initial kinematic mode to the final kinematic mode is determined, then the transition step counter is initialized to 1, then the mode transition is commanded to the kinematic mode of the transition step, then it is determined if the current kinematic mode is equal to the kinematic mode of the transition step, if this is the case, it is determined if the current kinematic mode is equal to the final kinematic mode, if this is the case, the method is terminated, if the current kinematic mode is not equal to the final kinematic mode, the transition step counter is incremented, then the method continues to the mode transition control step to the kinematic mode of the transition step, if it is determined that the current kinematic mode is not equal to the kinematic mode of the transition step, it is determined if the kinematic mode setpoint is equal to the final kinematic mode, if this is the case, the method continues in the control step from the mode transition to the kinematic mode of the transition step.

In order to make a decision on whether a transition interruption is possible, during a change of request of the driver, the following steps can be performed:

if it is determined that the current kinematic mode is not equal to the kinematic mode of the transition step and that the kinematic mode setpoint is not equal to the final kinematic mode, the stress relating to the interruption decision is performed, then it is determined if an interruption of the action is preferable.

Depending on the outcome of the decision, the following steps can be taken in order to continue the transition or to start a new transition:

if it was determined that an action is in the process of being interrupted, the action in progress is stopped at the transmission level then the method continues at the step during which it is determined that the kinematic mode setpoint corresponds to the current kinematic mode, if it was determined that it is preferable not to interrupt the current action, the transition continues toward the kinematic mode of the transition step, then it is determined if the current kinematic mode is equal to the kinematic mode of the transition step, if this is not the case, the method continues to the transition continuation step toward the kinematic mode of the transition step, if this is the case, the method continues to the step during which it is determined if the kinematic mode setpoint corresponds to the current kinematic mode.

The kinematic mode changes can be monitored to take place according to predefined shift trajectories.

The monitoring of the kinematic mode changes can make it possible to interrupt the action in progress so that the driver's intentions can be better taken into account.

The decision-making mechanism can be based on a comparison of the cost of the trajectories.

BRIEF DESCRIPTION OF THE DRAWINGS

Other features, objects and advantages of the invention will emerge on reading the following description, given only by way of non-limiting example, and with reference to the accompanying drawings in which.

DETAILED DESCRIPTION

Figure 1:
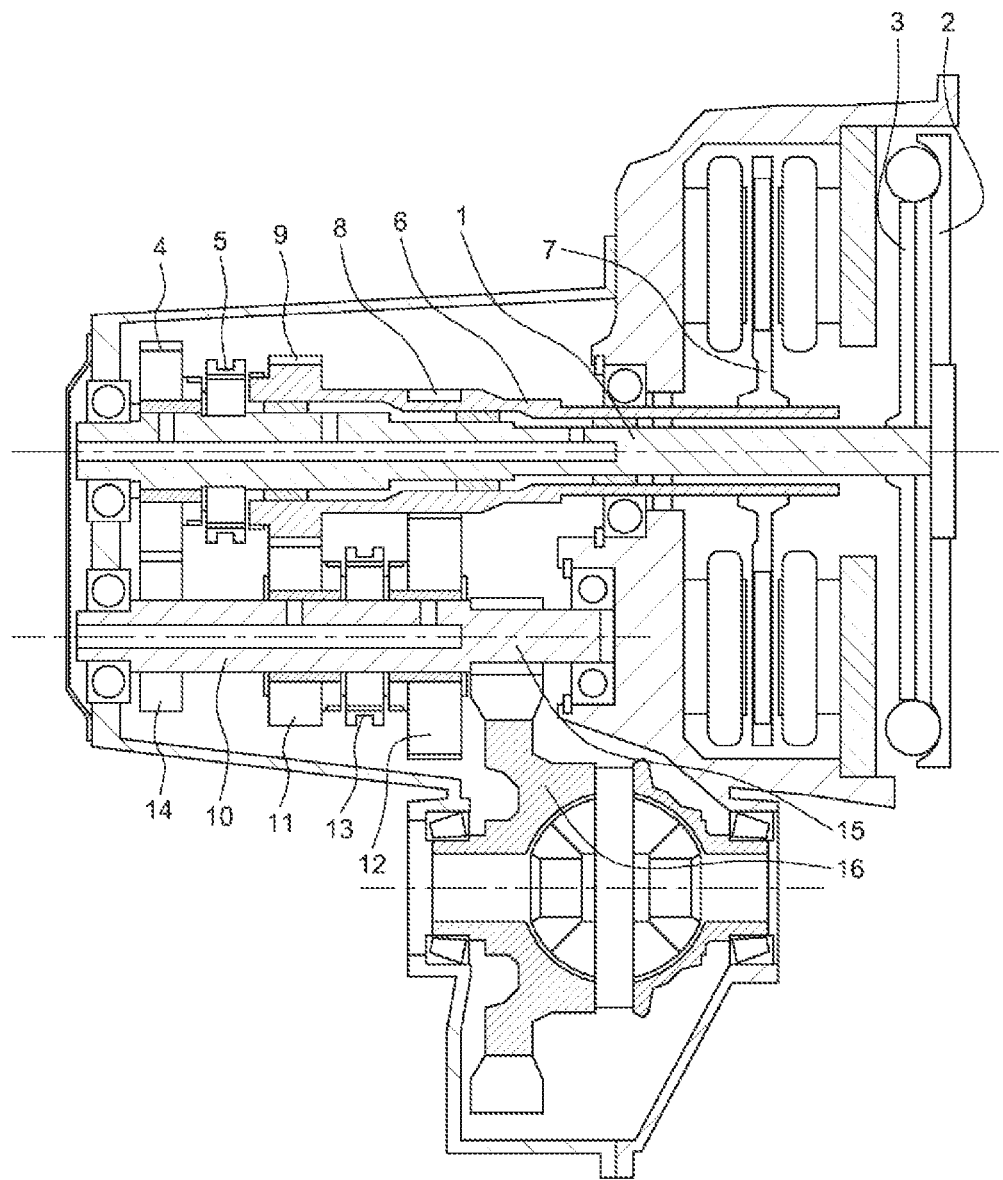
FIG. 1 illustrates a hybrid transmission for a motor vehicle.
Figure 2:
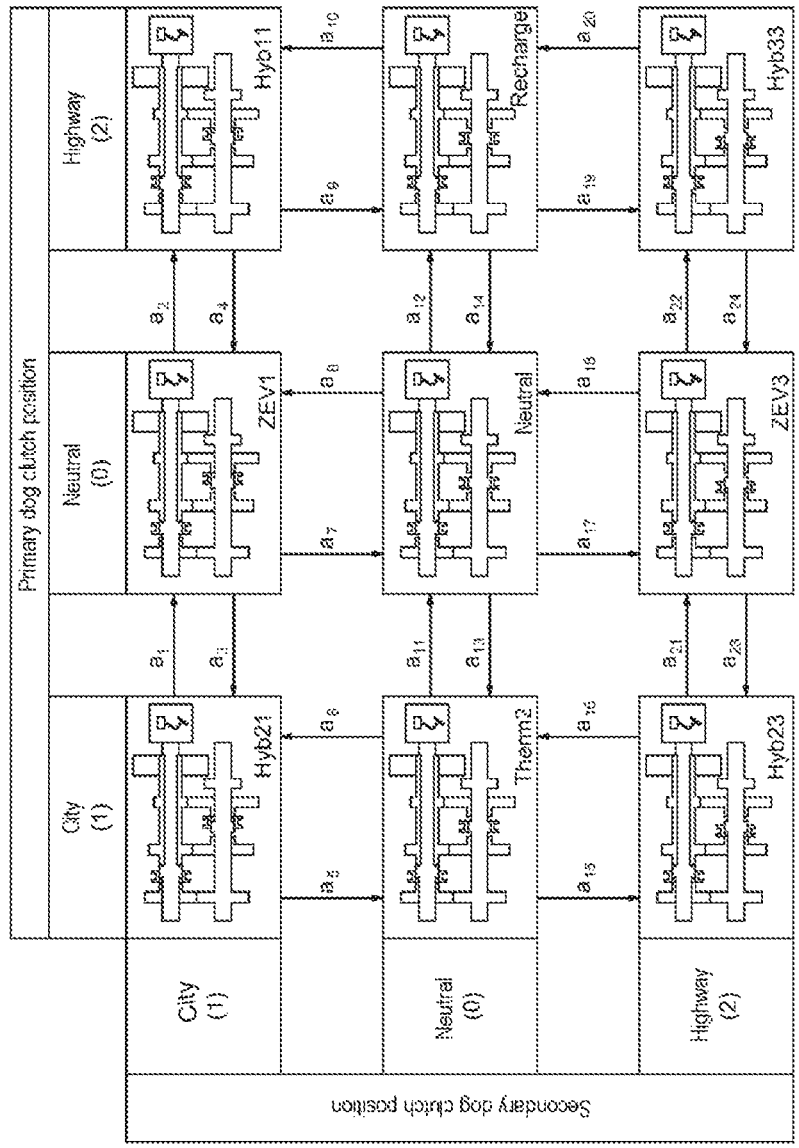
FIG. 2 illustrates the various kinematic modes of the transmission available depending on the positions of the dog clutches of the coupling systems.
Figure 3:
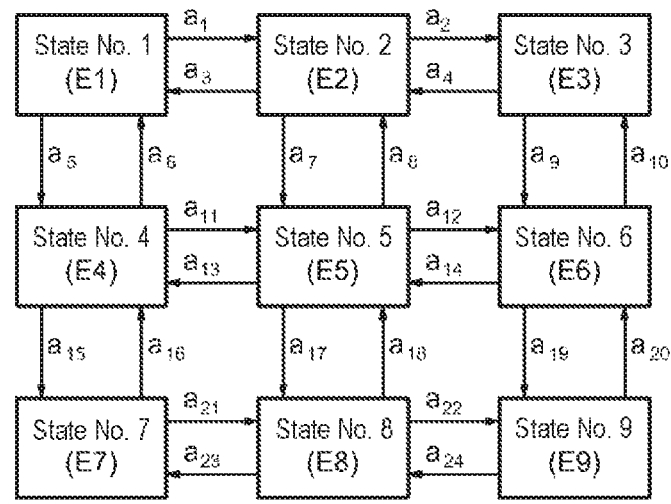
FIG. 3 is a simplified table of transitions taken from FIG. 2.

In FIGS. 2 and 3, the nine states $E_1$ to $E_9$ of the transmission of FIG. 1, and the 24 possible transitions $a_1$ to $a_{24}$ between these states are represented. Several paths are possible to move from one state to another. For example, to go from state $E_1$ to state $E_7$, the chains $E_1, a_5, E_4, a_{15}, E_7$ or $E_1, a_5, E_4, a_{11}, E_5, a_{17}, E_8, a_{23}, E_7$, etc. may be performed.

To enable the decision, a cost (or weight) relative to each transition must be introduced in order to be able to determine how to satisfy the decision criteria selected.

$c_i$ represents the cost associated with the $a_i$ transition.

The total cost of a trajectory is thus the sum of the costs associated with the transitions covered within the scope of this trajectory. By repeating the second transition example described above, the following cost is obtained:

$$\text{Cost}(E_1,a_5,E_4,a_{11},E_5,a_{17},E_8,a_{23},E_7)=c_5+c_{11}+c_{17}+c_{23}$$

The possibility of a transition interruption can thus be determined by comparing the cost of two trajectories:
- the one that would be followed, according to the programming tables, to loin the new destination, by returning to the initial kinematic mode (i.e. by renouncing the transition in progress), and
- the one that would be followed, according to the programming tables, to join the new destination, since the former destination (i.e. the transition in progress is completed before responding to the new destination).

Figure 4:
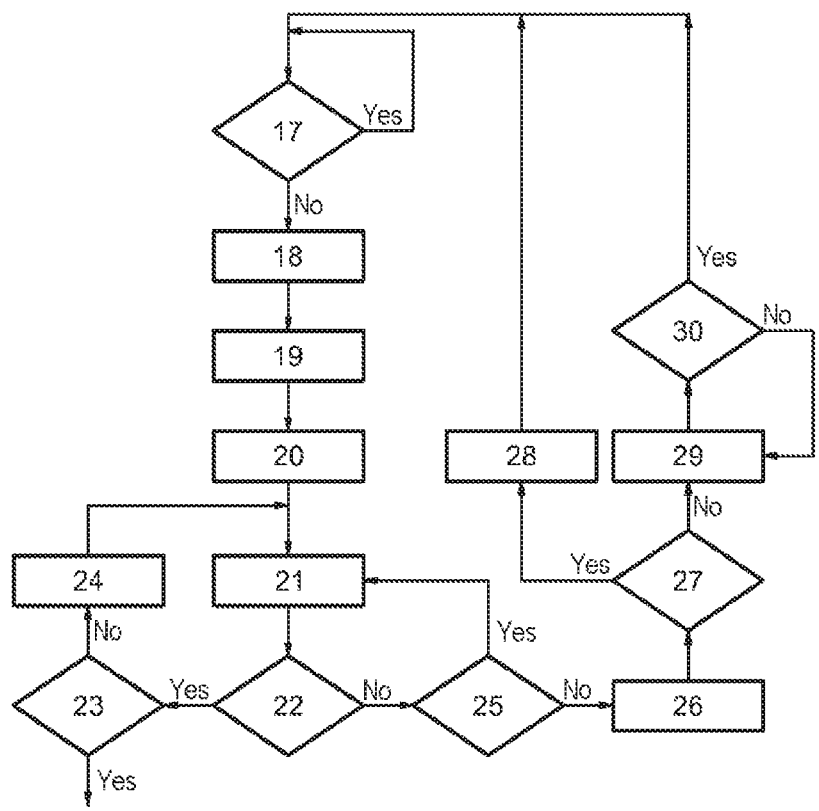
FIG. 4 illustrates the main steps of transition control method allowing the kinematic mode change while taking interruptions into account.

FIG. 4 illustrates a method for controlling the transmission making it possible to pass from a current kinematic mode to a kinematic mode setpoint. This method includes taking into account a transition interruption in the form of a kinematic mode setpoint change, in the course of transition.

The method comprises three large sets of steps for controlling the transition between kinematic modes, to make a decision on whether a transition interruption, during a change request of the driver, then continue the transition or begin a new transition depending on the outcome of the decision.

Steps 17 to 25 are used to control the transition between kinematic modes.

Steps 26 and 27 are used to make a decision on the possibility of a transition interruption, during a change request of the driver.

Steps 28 to 30 are used to continue the transition or to begin a new transition depending on the outcome of the decision.

During a first step 17, it is determined if the kinematic mode setpoint corresponds to the current kinematic mode. If this is the case, the method is terminated.

If this is not the case, the method continues during a second step 18, during which the current kinematic mode is stored in an initial kinematic mode value and the kinematic mode setpoint in a final kinematic mode value.

During a step 19, the trajectory (defined for example by a succession of peaks $E_i$=kin_mod (i)) is determined to pass from the initial kinematic mode to the final kinematic mode.

During a step 20, the transition step counter is reset to 1.

The process continues with a step 21 during which the mode transition is commanded to the kinematic mode of the kin_mod(i) transition step.

At a step 22, it is determined if the current kinematic mode is equal to the kinematic mode of the intermediate transition step.

If this is the case, the method continues to a step 23, during which it is determined if the current kinematic mode is equal to the final kinematic mode. If this is the case, the method is terminated. If this is not the case, the transition step counter is incremented to step 24 before the method continues to step 21.

If it is determined in step 22, that the current kinematic mode is not equal to the kinematic mode of the kin_mod (i) transition step, the method continues to step 25 during which it is determined if the kinematic mode setpoint is equal to the final kinematic mode.

If this is the case, the method continues to step 21. If this is not the case, the method continues to step 26, during which the stress relating to the interruption decision described above in step 27 is performed, it is determined if an interruption of the action is preferable.

The conditions to declare that it is preferable to interrupt the action are as follows:

No irremediable action is initiated (e.g.: the dog clutch system is not yet in motion), and The cost analysis favors the interruption in relation to continuing the current action.

If, at step 27, it was determined that there is an interruption of the current action, the method continues to step 28, during which the stopping of the current action is commanded at the transmission level followed by resumption of the method at step 17.

If, at step 27, it was determined that current action is not interrupted, the method continues to step 29 during which the transition continues to the kinematic mode of the intermediate transition step.

The process then continues to step 30 during which it is determined if the current kinematic mode is equal to the kinematic mode of the targeted intermediate transition step. If this is not the case, the method continues to step 29. If this is the case, the method continues to step 17.

Figure 5:
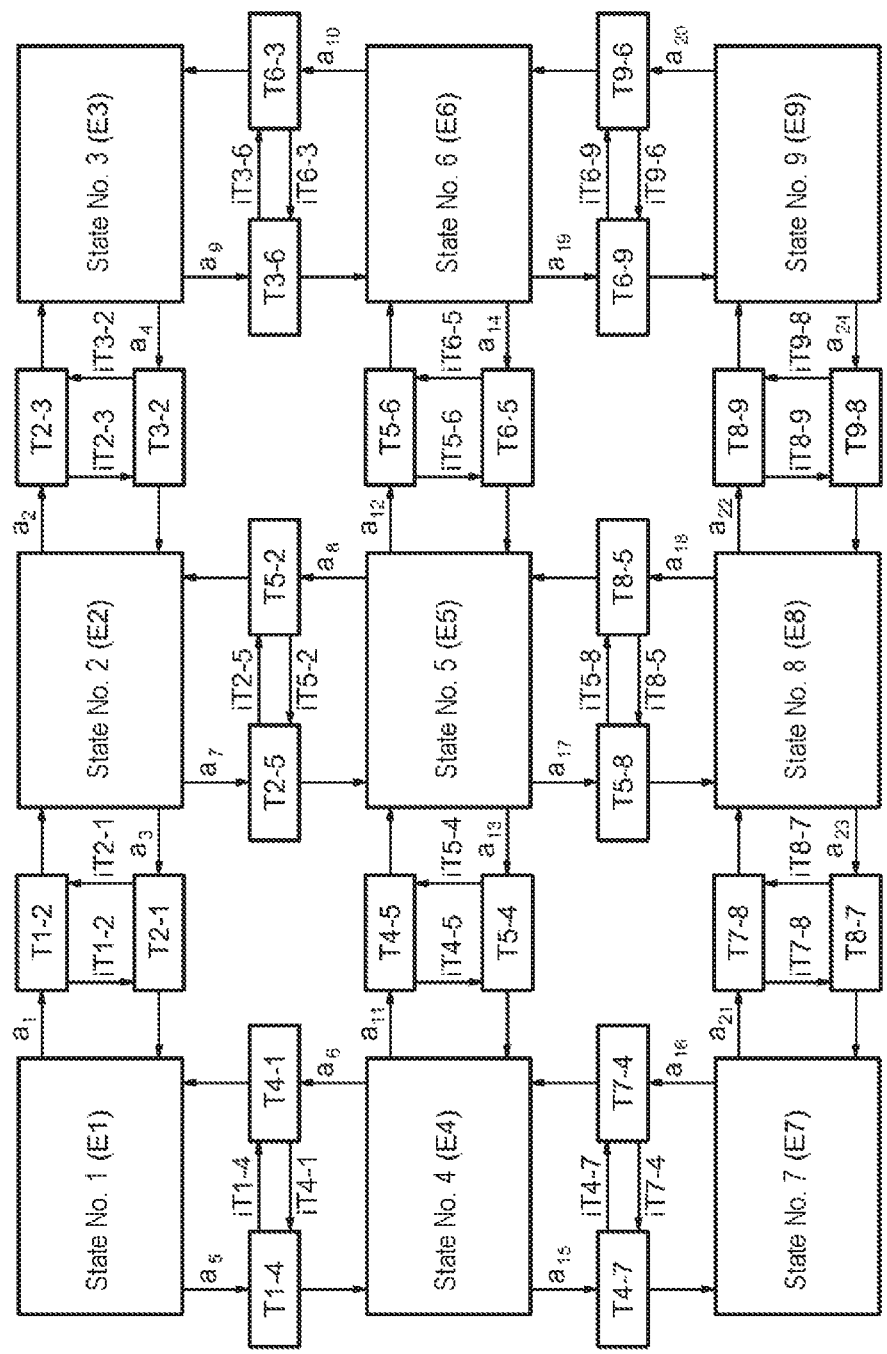
FIG. 5 illustrates a method for monitoring kinematic mode transitions comprising transition interruptions.

FIG. 5 illustrates the monitoring method including management of transition interruptions.

In relation to FIG. 3, the following elements were added to the stable states (i.e. established kinematic modes) $E_1$ to $E_9$, and to the transitions $a_1$ to $a_{24}$:

$T_{i-j}$: the state allowing the control of the transition from state $E_i$ to state $E_j$ $iT_{i-j}$: the flag for interrupting the transition $T_{i-j}$ to allow a return to state $E_i$ via transition $T_{j-i}$.

In the method illustrated by FIG. 5, the decision-making mechanism makes it possible to assess the flags $iT_{i-j}$. As such, if the decision to interrupt the current transition is made (i.e. $iT_{i-j}=1$), the transition $T_{i-j}$ (that was initiated) passes to transition $T_{j-i}$ which makes it possible to return to state $E_i$. The kinematic mode changes are thus monitored to take place according to predefined shift trajectories. This monitoring makes is possible to interrupt an ongoing action so that the driver's intentions can be better taken into account. Finally, as indicated above, the decision-making mechanism is based on a comparison of the cost of the trajectories.

The invention claimed is:

1. A method for controlling a hybrid transmission for a motor vehicle operable in at least two kinematic modes involving different connections of at least one internal combustion engine, of at least one electric machine, and at least two drive wheels, comprising:
   controlling a first transition between kinematic modes according to a current kinematic mode at an onset of the first transition and a kinematic mode setpoint,
   deciding, when it is determined that the kinematic mode setpoint has changed during the first transition, on whether an interruption of the first transition is possible,
   then, continuing the first transition or carrying out a second transition according to a result of the deciding on whether the interruption of the first transition is possible, and
   wherein the controlling the first transition between kinematic modes according to the current kinematic mode at the onset of the first transition and the kinematic mode setpoint includes:
      determining if the kinematic mode setpoint corresponds to the current kinematic mode,
      storing, when the kinematic mode setpoint does not correspond to the current kinematic mode, the current kinematic mode as an initial kinematic mode value and the kinematic mode setpoint as a final kinematic mode value, then
      determining a shift trajectory to pass a kinematic mode of the first transition from the initial kinematic mode to the final kinematic mode, then
      initializing a transition step counter to 1, then
      shifting the kinematic mode of the first transition according to the transition step counter, then
      determining if the current kinematic mode is equal to the kinematic mode of the first transition,
      determining, when the current kinematic mode is equal to the kinematic mode of the first transition, if the current kinematic mode is equal to the final kinematic mode,
      terminating, when the current kinematic mode is equal to the final kinematic mode, the control method,
      incrementing, when the current kinematic mode is not equal to the final kinematic mode, the transition step counter, then the control method continues to the shifting the kinematic mode of the first transition according to the transition step counter,
      determining, when the current kinematic mode is not equal to the kinematic mode of the first transition, if the kinematic mode setpoint is equal to the final kinematic mode,
      continuing, when the kinematic mode setpoint is equal to the final kinematic mode, the shifting the kinematic mode of the first transition according to the transition step counter.

2. The control method according to claim 1, in which the deciding on whether the interruption of the first transition is possible, during a change of request of a driver, includes the following:
   performing, when it is determined that the current kinematic mode is not equal to the kinematic mode of the transition and that the kinematic mode setpoint is not equal to the final kinematic mode, an analysis relating to the interruption decision, then
   determining whether or not to interrupt the first transition based on a result of the analysis.

3. The control method according to claim 2, in which, in order to continue the first transition or start the second transition according to an outcome of the deciding on whether the interruption of the first transition is possible, the following steps are performed:
   when it is determined that an action of the hybrid transmission is in the process of being interrupted, stopping the action, then determining if the kinematic mode setpoint corresponds to the current kinematic mode, or
   when it is determined not to interrupt the first transition, continuing the first transition toward the kinematic mode of the first transition according to the transition step counter, then determining if the current kinematic mode is equal to the kinematic mode of the first transition, and
   when the current kinematic mode is not equal to the kinematic mode of the first transition, continuing the first transition toward the kinematic mode of the first transition, and
   when the current kinematic mode is equal to the kinematic mode of the first transition, determining if the kinematic mode setpoint corresponds to the current kinematic mode.

4. The control method according to claim 2, in which changes between the kinematic modes are monitored to take place according to predefined shift trajectories.

5. The control method according to claim 4, in which the analysis relating to the interruption decision is based on a comparison of a cost of the predefined shift trajectories.

* * * * *